Jan. 18, 1938. T. H. THOMPSON 2,105,869
VEHICLE SPRING
Filed April 16, 1935    2 Sheets-Sheet 1

INVENTOR.
Tom H. Thompson
BY
Bates, Golrick & Teare
ATTORNEYS

Jan. 18, 1938.   T. H. THOMPSON   2,105,869
VEHICLE SPRING
Filed April 16, 1935   2 Sheets-Sheet 2

INVENTOR.
Tom H. Thompson
BY Bates, Goldrick & Teare
ATTORNEYS

Patented Jan. 18, 1938

2,105,869

UNITED STATES PATENT OFFICE 2,105,869

VEHICLE SPRING

Tom H. Thompson, Detroit, Mich.

Application April 16, 1935, Serial No. 16,618

14 Claims. (Cl. 267—47)

This invention relates to improvements in or pertaining to vehicle springs, especially leaf springs for use in automotive and other spring-supported vehicles or wherever springs are used for suspension purposes. The general object of the present invention is to provide a spring construction in which the riding qualities of the vehicle are improved under all road conditions.

A further object of the present invention is to provide an improved spring construction for automobiles which will increase or improve the riding qualities of the vehicle and make the vehicle easier to handle on the road by eliminating violent agitation of the wheels, thereby causing the vehicle to better grip the road, preventing side swaying and making easier the steering or guiding of the vehicle.

Another object of the present invention is to provide a spring which will give uniform action under all temperature conditions and all degrees of or length of service.

A further object is to obtain uniform spring action under all temperature and climatic conditions, regardless of the length or degree of service, entirely independently of servicing, such as periodic greasing, oiling, etc., and to fully obtain such action through the inherent characteristics of my spring assembly.

Other objects of the invention will become more apparent from the following description, reference being had to the accompanying drawings, the essential characteristics of the invention being set forth in the claims.

Figure 1:
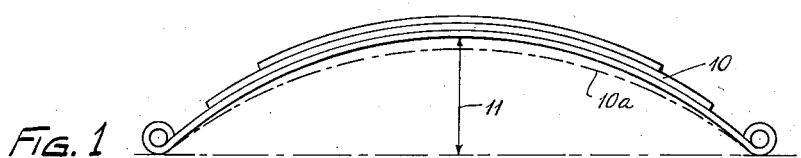
Figure 2:
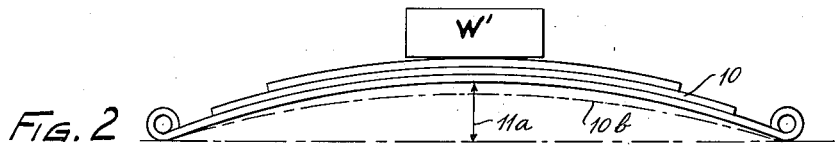
Figure 3:
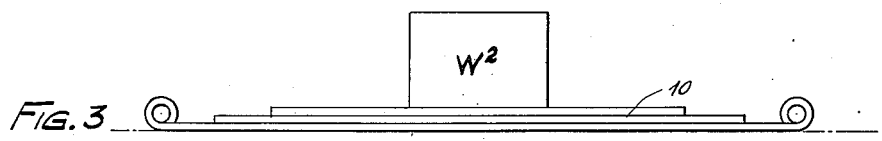
Figure 4:
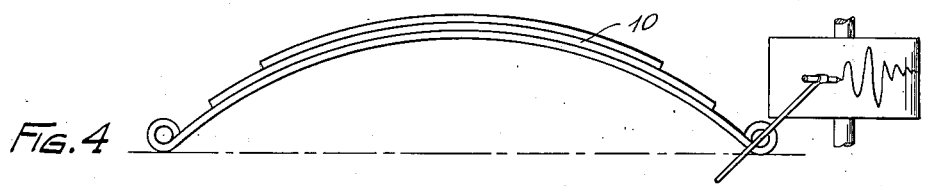
Figure 5:
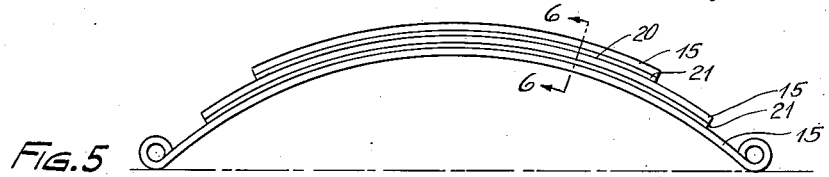
Figure 6:
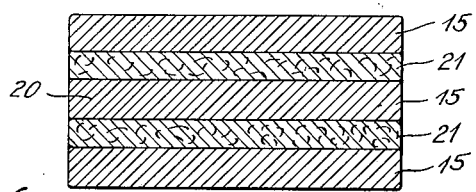
Figure 7:
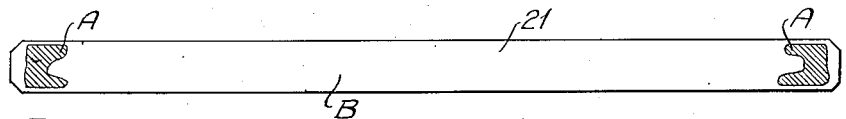
Figure 8:
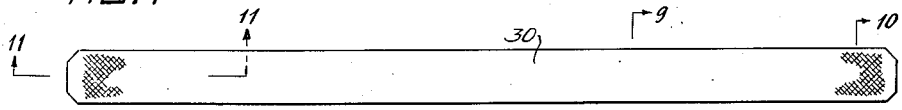
Figure 9:
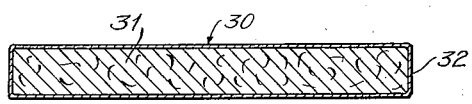
Figure 12:
Figure 10:
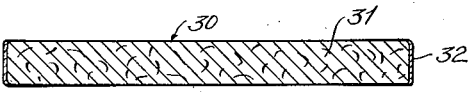
Figure 13:
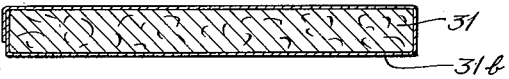
Figure 11:
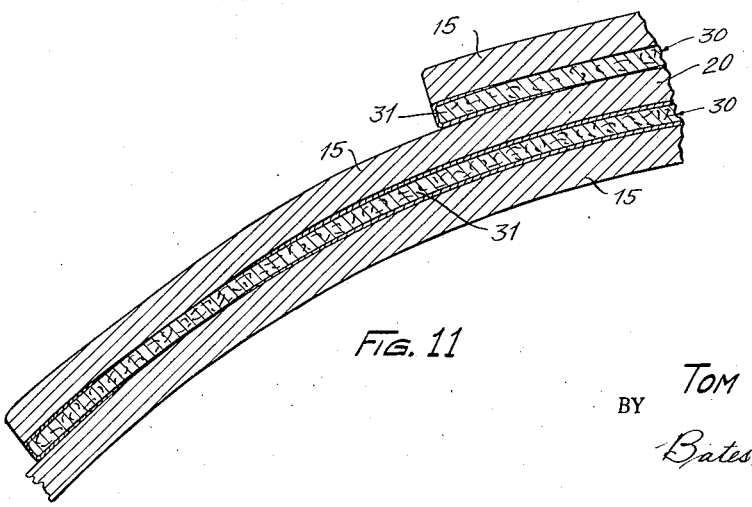

In the drawings, Figs. 1, 2 and 3 are diagrammatic illustrations of a method used to determine the static friction of a leaf spring assembly; Fig. 4 is a diagram illustrating the measuring of the cycles of oscillation of a spring used to determine the amount of dynamic friction; Fig. 5 is a side elevation of my improved spring; Fig. 6 is a section as indicated by the line 6—6 on Fig. 5; Fig. 7 is a plan view of one form of spring insert; Fig. 8 is a plan view of a modified form of spring insert; Fig. 9 is a section through the insert of Fig. 8, the planes of the section being indicated by the line 9—9 on that figure; Figs. 10 and 11 are sections through the insert illustrated in Fig. 8 after it has been subjected to nominal normal use; Figs. 12 and 13 are sectional views illustrating modified forms of liners.

Vehicular leaf springs comprising a plurality of superimposed spring leaves are well known at the present time. Such springs generally comprise metallic leaves of varying length, superimposed, one above the other, and tied together substantially midway between the ends of the leaves, the longest leaf being secured at its end by means of suitable shackles in the chassis of the vehicle and the entire group of leaves being secured to the axle substantially midway between the ends of the leaves. Springs of this general nature are given the normal camber, or amount of curvature, and termed or rated as, for instance, a hundred pound spring. Such rating means that it would take one hundred pounds of pressure applied to the center of the spring for each inch required to deflect the spring to eliminate the camber and cause the spring to assume a straight-line position, and to further deflect the spring in a reverse direction it would require one hundred pounds for each additional inch of deflection. Fig. 1 illustrates such a spring in its normal or unloaded position.

Assuming that the spring 10, illustrated in Fig. 1, is rated a one-hundred pound spring, and that the middle ordinate 11 of the spring is ten inches, and that a dead weight W1 of five hundred pounds is slowly applied to the spring, as indicated in Fig. 2, we find that the middle ordinate 11a becomes five inches. As more weight is slowly added to the spring, it deflects until, when five hundred pounds more has been added, making a total of one thousand pounds, W2 Fig. 3, we find that the camber of the spring has been eliminated, as shown in Fig. 3. As each one hundred pounds is added to the middle ordinate, it decreases one inch. When the total of one thousand pounds is reached, the spring assumes a straight-line position. However, as each one hundred pounds is removed, the spring returns, increasing the middle ordinate of the camber, but actual tests show that the spring returns at different rates and will not return to the full ten-inch camber, even when the entire load is removed, and even though such removal is made slowly in the absence of any vibration of the spring. The position of the spring after 500 and 1000 pounds have been removed is diagrammatically indicated by the dot and dash lines 10a and 10b in Figs. 2 and 1, respectively. The difference between the two positions is due to the friction between the leaves. However, if the spring assembly is struck a sharp blow, as with a hammer or weight, the spring will, practically speaking, return to full camber at zero weight.

The figures representing the weight and distance above given are more or less theoretical, being based upon a perfect spring and in the absence of all vibrations. The weighting of the spring, as noted above, was made so as to slowly deflect the spring, hence, the differential in pounds of given deflection between a given ordinate distance during the application of the load and the ordinate distance during the removal of the load represents for all practical purposes only the static friction. The dynamic friction is found by rapidly oscillating the spring while under full loading and by measuring the oscillation curve, as indicated in Fig. 4.

I have found that if a one-hundred rate spring, having a static internal friction of fifty pounds, measured as above noted, is applied to an automotive vehicle, and the spring exposed to a force, as when the vehicle encounters a bump on the road, there is no spring action whatsoever until the force is greater than fifty pounds, at which point the friction between the spring leaves is overcome. Therefore, the passenger in the car will feel every small bump exerting a force, which is less than the internal friction of the spring. This is the action of a spring when the vehicle is moving at a slow rate of speed, resulting in a jolting boulevard or slow-speed ride. If the force applied to the wheel were increased, so that it would be greater than the internal friction of the spring, the passenger feels only a fraction of the bump because the spring flexes and takes up and dissipates a considerable part of the force exerted. This is the action of the spring when the vehicle is moving at a high rate of speed and results in a comparatively smooth high speed ride.

To eliminate the jolty ride at slow speeds it has been the custom to provide so-called "friction free springs", such springs being springs which have been lubricated to a maximum, decreasing, as far as is practical, the friction between the spring leaves. Such a spring, however, decreases the dynamic friction, as well as the static friction, and hence, as has been confirmed by tests, while providing an even boulevard or slow speed ride, by eliminating the jolting action, nevertheless, at high vehicle speeds, increases the flexing movements of the spring and the periodicity of such flexing movements until the vehicle becomes unmanageable, due to such excessive operation and oscillation of the spring. To overcome this, external shock absorbers have been disposed between the axle and the vehicle, which modify the cycles of oscillation and the degree of flexing movements of the spring and the shock absorbers bring about an irregular dampening effect of each cycle of oscillation of the spring. The irregularity of this dampening action of the spring reacts on the wheels of the vehicle, making the steering of the vehicle difficult. Likewise, regardless of the outside controlling factor, namely, the shock absorber, the spring has an inherent internal whip, in other words, the spring at all times attempts to describe a perfect oscillation. This causes the wheels of the vehicle to be maintained in violent agitation on the road, giving the factor of axle dancing, resulting in a vehicle which is neither comfortably steerable nor controllable.

The ideal spring, as is evident from the foregoing examples, is one which provides the smooth action on a boulevard or slow speed ride of the "friction-free" type-spring, and an action on a fast speed or rough surface drive, of a spring which has a maximum internal dampening factor. In other words, the ideal spring is one in which the static friction is at a minimum, and the dynamic friction is at a maximum, that is, a spring having a static friction factor less than that found in a normal spring and a dynamic friction factor greater than that found in a normal spring.

Therefore, one of the purposes of the present invention is to devise a spring which will provide both the action of a slow speed or boulevard riding quality of a "friction-free" spring and the riding and also the roadability qualities, at high speed or rough road drives, of a spring having a maximum dampening or dynamic friction factor, and also to maintain these qualities constantly uniform under all temperature and service conditions.

The object of the present invention is preferably accomplished by inserting between the leaves of the spring a liner which will act both to decrease the static friction between the leaves and to increase the dynamic friction.

Liners have been, in the past, inserted between the leaves of a spring. However, for the greater part these liners acted solely to decrease the friction between the leaves,—that is, they were in the nature of lubricating members to lubricate the spring surfaces and decrease the static friction therebetween. Such liners, of course, produced results similar to those described in connection with a "friction-free" spring.

Other liners, however, which have been less frequently used, are those designed to increase the static friction between the spring leaves. Such liners serve to increase both the static and dynamic friction. Hence, while they, to a certain degree, improved the riding quality of the vehicle at the higher rate of speeds, they, nevertheless, by increasing the static friction, decrease the boulevard or slow-riding qualities of the car.

The present invention, however, contemplates so arranging the spring as to decrease the static friction and at the same time dampen the oscillation of the spring at high rates of speed by increasing the dynamic friction and preferably accomplishes this, as shown in Figs. 5 and 6, by inserting between the leaves 15 of the spring 20, liners 21 which extend substantially the entire length of the leaves. These liners are so constructed that they actually decrease the static friction and increase the dynamic friction factors of the spring.

I have found that during the normal action of the spring, at the higher rates of speed, the load of the vehicle is transmitted from the leaves to the liner near the ends of the spring leaves, and hence by arranging the liner so that the portion of the liners adjacent the outer ends of the spring leaves are formed of a material which increases the friction between the leaves, I am able to increase the dynamic friction without appreciably affecting the static friction. Likewise, by constructing the remaining portions of the liner in such a manner and/or of such a material as will decrease the friction between the leaves, I am able to decrease the static friction an amount greater in comparison to the slight increase of the static friction caused by the liner construction adjacent the ends of the leaves. The intermediate strip of the liner therefore serves as an eliminator or controller of the static friction factor.

A liner such as above described is diagrammatically illustrated in Fig. 7. As there shown, the liner 21 may be formed of rubber compositions A and B, which are vulcanized to form a homogeneous mass. The composite "A" is a rubber composition including a substance having a high coefficient of friction such as asbestos fiber, powdered carborundum or similar substances, and is disposed adjacent the ends of the liner, substantially at the point of weight transfer of the spring during its flexing movements at high speeds. The remaining portion of the liner is composed of a rubber composition material "B" including a substance having a low coefficient of friction such as soapstone talc, pulverized aluminum or cadmium. Both the compositions A and B are preferably substantially non-compressible and flexible, so that the internal stresses of the liner will have no appreciable offset on the action of the spring. The summation of the decrease in static friction, due to the material B, is readily maintained great, in comparison to the increase in static friction due to the material A, by maintaining a difference in spring leaf contacting areas of such materials. Such a spring insert placed between the leaves of the spring materially decreases, and for all practical purposes eliminates static friction and at the same time due to the increase in friction at the load transferring points of the spring (at high speed) increases the dynamic friction, thereby providing a spring having equally advantageous riding qualities at both high and low speeds.

I further contemplate providing a liner so constructed as to decrease the static friction and increase the dynamic friction as the spring is used. This is advantageous in that the static friction is decreased a maximum amount when the vehicle is new and the dynamic friction is increased as the vehicle becomes "broken in". Such a liner 30 is illustrated in Figs. 8 to 12, inclusive. As there shown, the liner comprises a laminated strip, the core 31 of which is formed of a composition having a comparatively high coefficient of friction, such as the rubber composition heretofore mentioned. This core 31 extends the full length of the liner, but is covered with a comparatively thin coating of friction reducing material 32, such as the material B, heretofore mentioned. As the insert is assembled in the spring, the leaves thereof contact only with the friction eliminating material, but as the spring is used, the thin film of friction reducing material wears through at the points of transmission of weight at the high periods of spring flexing at high speeds. I have found that this area, indicated by cross-hatching in Fig. 8, after the car has been broken in, does not increase in any substantial amount.

I have found that by merely facing or wrapping an insert made of friction producing material with ordinary "waxed or oiled paper", as shown at 31a and 31b in Figs. 12 and 13, respectively, such paper will act as a friction eliminating material and will wear through adjacent the ends of the springs after the car has been driven the first few hundred miles and expose the proper amount of friction material to the spring leaves without materially increasing the static friction.

A very efficient laminated liner is provided by first manufacturing a liner of a strip of material having a comparatively high coefficient of friction, such as a flexible brake lining material. It is desirable, of course, that such material be as flexible as possible, so that the internal fiber factors of the material will, for all practical purposes, have no effect on the spring. The rubber composition A, heretofore mentioned, provides such a material. After the liner strip is completely formed, a coating of friction-resisting or eliminating material is applied thereto, such as by spraying with or immersing the liner in a mixture comprising eight (8) parts of hard paraffin, one and one-half (1½) parts vermiculite, one-half (½) part lamp black mixed in a temperature of 150 degrees Fahrenheit for a time sufficient to secure a coating on both sides of the liner of approximately one hundredth (1/100) of an inch in thickness. Obviously, coatings of other friction-eliminating compositions may be applied in the same manner. For instance, I may coat the liner with a mixture of paraffin and carnauba wax. Such mixture may contain soapstone, vermiculite or zonolite to decrease the coefficient of friction of the liner. Vermiculite is a class of minerals usually having a granular scaly appearance and generally including silica, alumina and magnesia, as for instance, magnesium mica. Zonolite is an exfoliated form of mica. Hence, in the claims the term mica is intended to include ordinary mica, vermiculites, as well as exfoliated mica, such as zonolite.

While I have described the coating of the liner to obtain the desired frictional components, it is obvious that I may secure the desired components by coating the spring leaf itself. In which case I dip each spring leaf in a bath of paraffin, carnauba wax and zonolite, the temperature of the bath being about 230 degrees Fahrenheit. The leaves are then cooled and assembled into spring formation by placing flexible liners therebetween, the surfaces of the liners having a comparatively high coefficient of friction.

A spring having liners coated as above described, when applied to an automotive vehicle, and the vehicle driven about fifty miles, shows a definite marking distinguishing the friction-resisting and friction-eliminating areas of the spring from each other. This marking may be called a "friction picture", the former being a comparatively large area, while the latter is a comparatively small area adjacent the ends of the liner. After the vehicle has been driven thirty thousand miles of ordinary driving, the "friction picture" remains substantially unaltered, indicating that after the initial break in period has been passed, there is no change in the action of the liner.

I claim:

1. A leaf spring assembly comprising superimposed spring leaves, a flexible liner interposed between the spring leaves, said liner being composed of two materials, one of said materials being adapted to increase the friction between the spring leaves and the other of said materials being adapted to decrease the friction between the spring leaves, one of said materials being arranged to act only when parts of the other material has been subjected to wear.

2. A multiple leaf spring having liners disposed between the leaves of the spring, certain areas of the surfaces of said liners which contact with the spring leaves being made of a friction producing material and other areas of the surfaces of the liners in contact with the same spring leaves as said first mentioned areas but at other regions thereof being made of a friction reducing material.

3. A multiple leaf spring having liners disposed between the leaves of the spring, the surfaces of said liners which contact with the spring leaves adjacent the ends thereof being made of a friction producing material and the spring contacting surfaces of the intermediate spring contacting portions of the liners being made of a friction reducing material.

4. A multiple leaf spring comprising a plurality of spring leaves, inserts disposed between the spring leaves and contacting therewith, said inserts being provided with two types of contact surfaces to simultaneously contact with a spring leaf, one of said types of surfaces being adapted to increase the friction between the spring leaves and the other type surface being adapted to decrease the friction between the spring leaves.

5. A multiple leaf spring comprising a plurality of spring leaves, inserts disposed between the said leaves, said inserts being made of a friction increasing material and also provided with a coating of friction reducing material.

6. An insert adapted to be positioned between the leaves of a multiple leaf spring comprising a self contained laminated member, having at least three laminations including an inner lamination of fibrous material, the outer laminations being made of a material having a coefficient of friction low in comparison with the coefficient of friction of the next adjacent lamination.

7. A multiple leaf spring comprising a plurality of spring leaves, an insert disposed between adjacent spring leaves and contacting therewith, said insert being composed of a flexible, wear-resisting material adapted to increase the friction between the spring leaves and insert, and being coated with a comparatively thin layer of flexible friction eliminating material comparatively easily destructible by wear.

8. A spring leaf insert comprising a flexible core coated with a mixture of paraffin and a material which raises the melting point of the paraffin, the coating being sufficiently thin to permit a wearing away of the coating at separate points when the leaf is in use between other leaves in a vehicle spring.

9. A spring leaf insert comprising a flexible core coated with a mixture of paraffin, carnauba wax and mica, the coating being sufficiently thin to permit a wearing away of the coating at separated points when the liner is in use between the spring leaves of a vehicle.

10. In a laminated leaf spring, a flexible liner between adjacent leaves, one surface area of the liner having a high coefficient of friction with respect to an adjacent spring leaf surface in contact therewith, and another area of the liner having a substantially negligible friction coefficient with respect to an adjacent contacting surface of the same spring leaf.

11. In a laminated leaf spring, a flexible liner between adjacent leaves, said liner incorporating means throughout the major area thereof to decrease its coefficient of friction with relation to an adjacent spring leaf, said means being substantially absent from a limited area of the liner adapted to contact with the same spring leaf.

12. A leaf spring comprising a plurality of superimposed spring leaves, liner means between two of said leaves and having one area in contact with a leaf tending to decrease the static friction and another area in contact with the same leaf tending to increase the dynamic friction between the two spring leaves.

13. A leaf spring comprising a plurality of superimposed spring leaves, liner means inserted between two adjacent leaves and having means which decreases the static friction between the spring leaves and also increases the friction between the spring leaves in limited areas.

14. A leaf spring assembly comprising superimposed spring leaves, a flexible liner interposed between the spring leaves, said liner being composed of two materials having respective spring contacting areas in contact with the same spring leaf, one of said materials tending to increase the effective friction between the spring leaves, and the other of said materials tending to decrease the effective friction between the spring leaves.

TOM H. THOMPSON.